May 1, 1923.
J. L. THORNTON
LITTER CARRIER
Filed Nov. 30, 1920
1,453,610
2 Sheets-Sheet 1
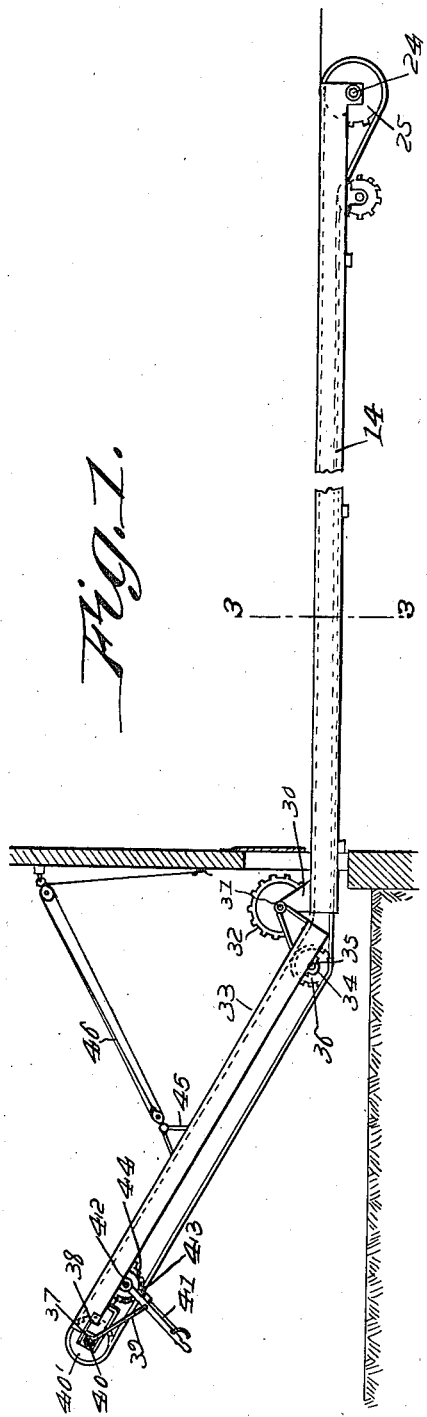
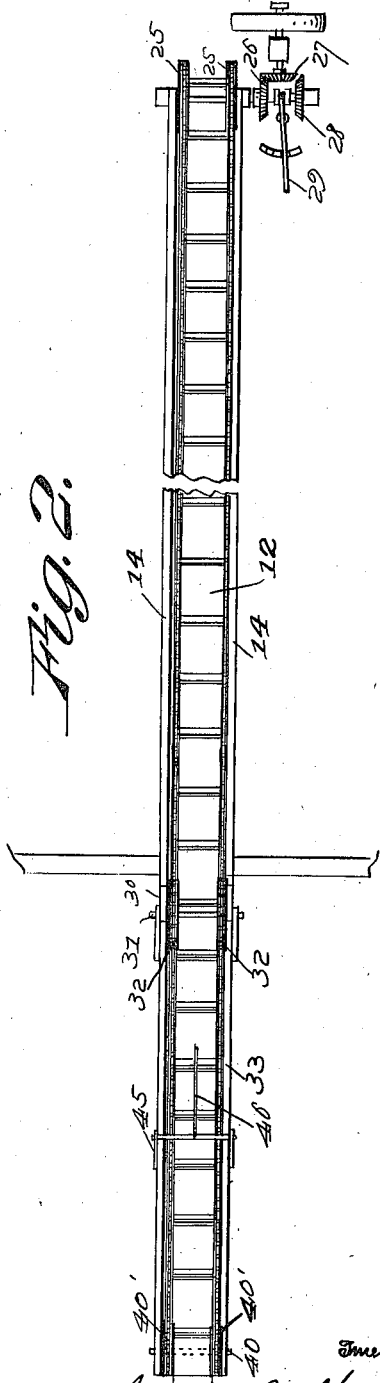

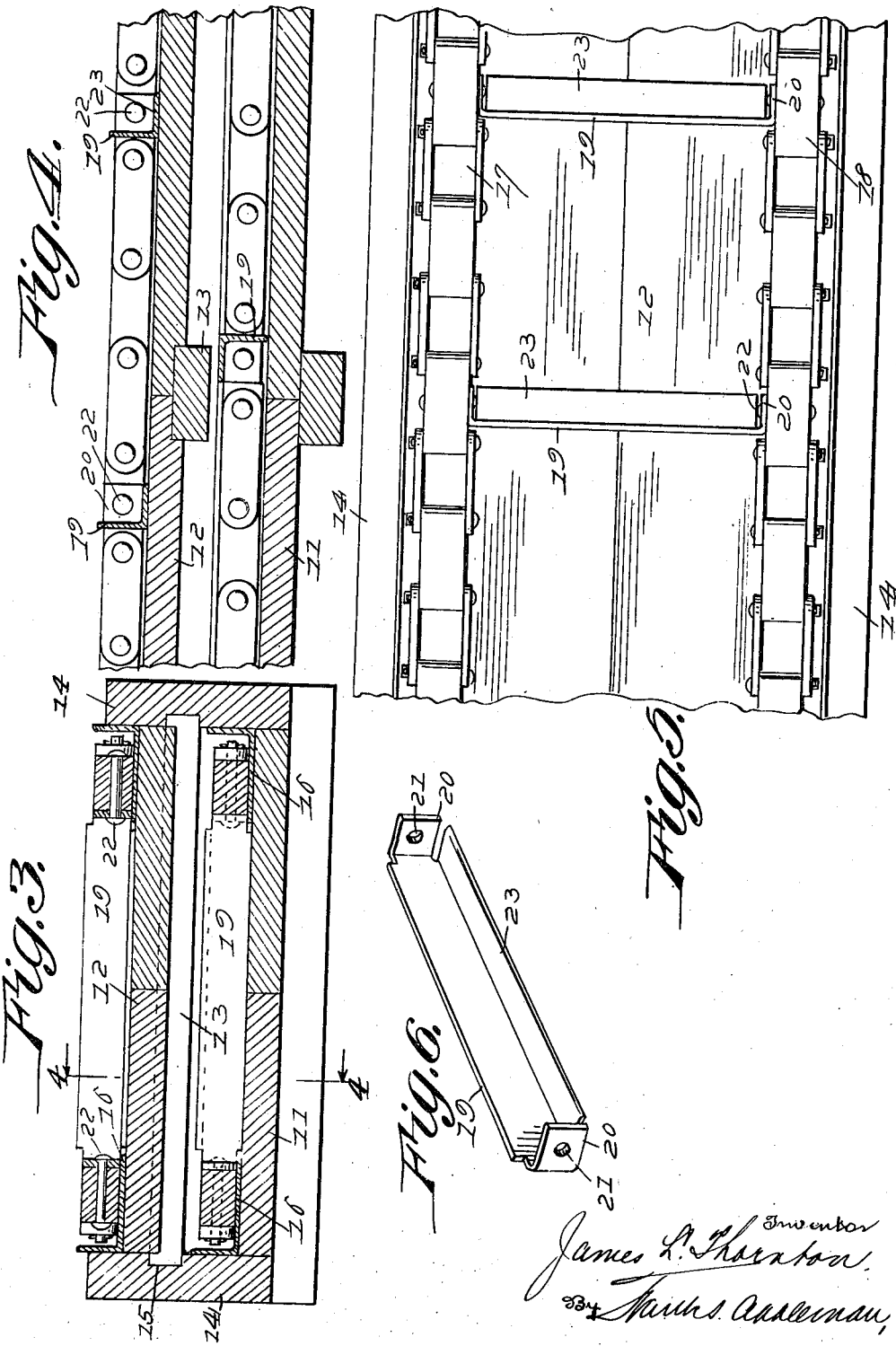

Patented May 1, 1923.

1,453,610

UNITED STATES PATENT OFFICE.

JAMES LEE THORNTON, OF CAMP HILL, PENNSYLVANIA.

LITTER CARRIER.

Application filed November 30, 1920. Serial No. 427,324.

*To all whom it may concern:*

Be it known that I, JAMES L. THORNTON, a citizen of the United States of America, and resident of Camp Hill, in the county of Cumberland and State of Pennsylvania, have invented certain new and useful Improvements in Litter Carriers, of which the following is a specification.

This invention relates to conveyers or carriers particularly of a type for use in connection with the carrying or conveying of materials to and from a barn, the said device being sometimes known as a litter carrier, but it is the purpose of this inventor to produce a device which is also capable of carrying food for the animals housed in the barn so that the invention is a carrier which may be utilized for the carrying of litter or the carrying of grain or food; the said invention having for its object the provision of novel means whereby the material carried to the exterior of a building may be elevated and deposited in a transporting device such as a wagon, truck or the like, the said invention also being capable of carrying grain which may be transferred from the wagon or truck to the conveyer.

A still further object of this invention is to produce a structure or way in which the conveying mechanism is located so that it may be operated free of any moisture or fluid, means being provided whereby the fluid may be discharged without affecting this transporting mechanism.

A still further object of this invention is to produce a carrier having blades pivotally mounted on flexible members such as chains so that the blades may operate to push the material being transported without injuring the bottom of the chute or way and without unduly deteriorating the mechanism of the conveyer.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a carrier embodying the invention;

Figure 2 illustrates a plan view thereof;

Figure 3 illustrates a transverse sectional view, on dotted line 3—3 Fig. 1;

Figure 4 illustrates a longitudinal sectional view of a fragment of a conveyer in dotted line 4—4 Fig. 3;

Figure 5 illustrates an enlarged plan view of a fragment of the mechanism, and

Figure 6 illustrates a perspective view of one of the conveying blades.

In these drawings 14 denotes the sides of a trough, chute or way in which the conveying mechanism is installed and in the present embodiment of the invention, the said sides 14 are associated with a bottom floor 11 and a top floor 12, the conveyer moving over the top floor in one direction and over the bottom floor in an opposite direction, as shown more particularly by Figs. 3 and 4 of the drawings.

The top floor 12 is preferably constructed of solid planking and rests on transverse sills or beams 13 having their ends imbedded in the sides 14 as shown at 15. The sills or beams may be made of wood or metal, but that is a detail of construction which may be changed to suit particular requirements.

The bottom floor 11 is preferably made of concrete whereas the sides 14 will likewise be made of concrete. The floor 11 is provided with longitudinally extending angle bars, one of the webs thereof providing sills 16 on which the conveyer chains travel and these support the blades of the conveyer clear of the concrete floor so as to prevent abrasion and wear incident to the travel of the conveyer.

The conveyer in the present embodiment of the invention comprises side chains which may be termed "sprocket chains" 17 and 18 having plates 19 provided with integral ears 20 with apertures 21 secured to links of the chain by fastenings 22 such as pins or rivets so that the plate may have turning movement on the said fastenings. A blade 23 is formed integral with the plate and it stands at right angles to the plate, it being understood that a plurality of the scraper blades may be supplied as parts of the conveyer arranged in assembled relation to the sprocket chains as shown and described.

When the conveyer is being operated to carry material, the blade 23 will lie approximately parallel with the upper floor of the conveyer trough, whereas the plate 19 will stand at right angles thereto and constitute an abutment which engages the material being conveyed so it will be caused to travel with the conveyer blade.

While I have described this conveyer element in the singular, it is to be understood that a number of them will be employed, the number depending upon the length of the conveyer, the material to be carried and other conditions which would be taken into account in the manufacture of a device for efficiency.

There is a shaft 24 mounted to rotate at or near the rear end of the trough and this shaft may carry sprocket wheels 25 which engage the sprocket chains, and the shaft may be provided with a bevel gear wheel 26 engaged by a driving bevel gear wheel 27 whereby the conveyer is operated. A second bevel gear wheel 28 may also be driven by the bevel gear wheel 27 for operating another conveyer similar to that just described if said conveyer is approximately parallel with the first, and these conveyed operating devices may be under the control of a shifting lever 29 which will throw one or the other of the conveyers into action according to the direction of the movement of the lever.

At or near the front end of the trough there are brackets 30 in which a shaft 31 is mounted on which sprocket wheels 32 are placed for rotation and in such relation to the sprocket chains 18 as to cause the teeth of the sprocket wheels 32 to engage the sprocket chains. In the present embodiment of the invention, the shaft 31 constitutes a fulcrum or pivot for an extension 33 of the conveyer trough, the said conveyer trough having journal bearings 34 connected to it for supporting a shaft 35 on which sprocket wheels 36 are carried for engaging the return lead of the conveyer chains at the angle where the extension coacts with the main trough so that the conveyer chains may be properly guided to cause the conveyer to operate properly.

At the outer end of the extension 33 there are journal bearings 37 slidably held in guides 38 and adjustable longitudinally thereof by means of the link 39 which is pivotally connected to a shaft 40 mounted in the journal bearing; the said link being also connected to an operating handle or lever 41 mounted for oscillation on the pin 42 and held in different positions of adjustment by a detent 43 which engages the toothed segment 44. By providing means for lengthening or shortening the course of the conveyer, the extension 33 may be moved to different inclinations with respect to the horizontal so that its end may discharge into a high or low receptacle without impairing the efficiency of the conveyer.

The extension 33 may be adjusted and held at different inclinations by means of a yoke 45 to which a tacle 46 may be connected for lowering or raising the extension, and of course, the extension can be moved to a vertical position practically and when the operating mechanism therefor is secured, it may be held at different positions of adjustment.

The construction and the relation of parts as well as the operation having been stated in connection with a description of each part, a resumé of the operation of the device as a whole is believed to be unnecessary to an understanding thereof by one skilled in the art.

I claim:

1. In a litter carrier, a trough comprising an upper and lower floor and sides integral with the lower floor, means supported by the sides for holding the upper floor, a conveyer comprising sprocket chains having one course traveling on the upper floor and another course traveling on the lower floor in opposite directions, conveying elements each comprising a plate having integral apertured ears and blades integral therewith and at right angles to the plate, means for pivotally connecting the said carrying elements to the sprocket chains, and means for driving the sprocket chains.

2. In a litter carrier, a trough comprising an upper and lower floor and sides integral with the lower floor, means supported by the sides for holding the upper floor, a conveyer comprising sprocket chains having one course traveling on the upper floor and another course traveling on the lower floor in opposite directions, conveying elements each comprising a plate having integral apertured ears and blades integral therewith and at right angles to the plate, means for pivotally connecting the said carrying elements to the sprocket chains, means for driving the sprocket chains, an extension trough, means for oscillatably mounting the extension trough in operative relation to the first mentioned trough, means for guiding the conveyer there-over and there-under, elements at the outer end of the extension over which the conveyer operates, means for moving the axis of the said elements and for holding them at different positions of adjustment, and means for holding the extension at different angles of inclination.

JAMES LEE THORNTON.